US011120775B2

(12) United States Patent
Hamaker et al.

(10) Patent No.: US 11,120,775 B2
(45) Date of Patent: Sep. 14, 2021

(54) COMPOSITING AN IMAGE FOR DISPLAY

(71) Applicant: DISPLAYLINK (UK) LIMITED, Cambridge (GB)

(72) Inventors: Eric Kenneth Hamaker, Cambridge (GB); Colin Skinner, Cambridge (GB); Douglas Morse, Houghton (GB); Richard Akester, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 16/335,670

(22) PCT Filed: Sep. 8, 2017

(86) PCT No.: PCT/GB2017/052642
§ 371 (c)(1),
(2) Date: Mar. 21, 2019

(87) PCT Pub. No.: WO2018/055332
PCT Pub. Date: Mar. 29, 2018

(65) Prior Publication Data
US 2020/0035206 A1 Jan. 30, 2020

(30) Foreign Application Priority Data

Sep. 23, 2016 (GB) ..................... 1616229

(51) Int. Cl.
*G09G 5/377* (2006.01)
*G06F 3/01* (2006.01)

(52) U.S. Cl.
CPC ............ *G09G 5/377* (2013.01); *G06F 3/012* (2013.01); *G06F 3/013* (2013.01);
(Continued)

(58) Field of Classification Search
None
See application file for complete search history.

(56) References Cited

U.S. PATENT DOCUMENTS

2008/0297436 A1* 12/2008 Oikawa ................ G06T 19/006
345/8
2010/0026714 A1 2/2010 Utagawa
(Continued)

FOREIGN PATENT DOCUMENTS

WO  WO 2012/071463   5/2012
WO  WO 2013/034981   3/2013
(Continued)

*Primary Examiner* — Tize Ma
(74) *Attorney, Agent, or Firm* — Haynes and Boone, LLP

(57) ABSTRACT

A method for compositing display data at a remote device to form an image for display involves the remote device receiving (S62) elements of the image, where the image includes display data forming a background layer, display elements forming a foreground layers and an overlay data layer. The remote device receives (S63) sensor information indicating one or more of a position of an eye of a viewer, a direction of focus of the eye of the viewer, and/or a position of a display. It then determines (S64) movement of a line of sight between the eye of the viewer and the display, determines an estimate of a future position of the line of sight at a future time based on the determined movement of the line of sight, and determines (S65) an adjustment to be made to the image based on the future position of the line of sight. The display elements of the foreground layer are composited (S66) relative to the display data of the background layer according to the determined adjustment and the composited image is forwarded (S67) for display at the future time.

14 Claims, 12 Drawing Sheets

(52) U.S. Cl.
CPC .............. *G09G 2340/0464* (2013.01); *G09G 2340/12* (2013.01); *G09G 2350/00* (2013.01); *G09G 2354/00* (2013.01); *G09G 2370/16* (2013.01)

(56) References Cited

U.S. PATENT DOCUMENTS

| | | |
|---|---|---|
| 2012/0154277 A1 | 6/2012 | Bar-zeev et al. |
| 2014/0002351 A1 | 1/2014 | Nakayama |
| 2014/0028794 A1 | 1/2014 | Wu et al. |
| 2015/0091943 A1 | 4/2015 | Lee et al. |
| 2015/0341616 A1* | 11/2015 | Siegel .................. H04N 13/128 348/54 |
| 2016/0255322 A1* | 9/2016 | Kerofsky ........... H04N 21/4318 348/51 |

FOREIGN PATENT DOCUMENTS

| | | |
|---|---|---|
| WO | WO 2015/099774 | 7/2015 |
| WO | WO 2016/073986 | 5/2016 |
| WO | WO 2016/118287 | 7/2016 |

\* cited by examiner

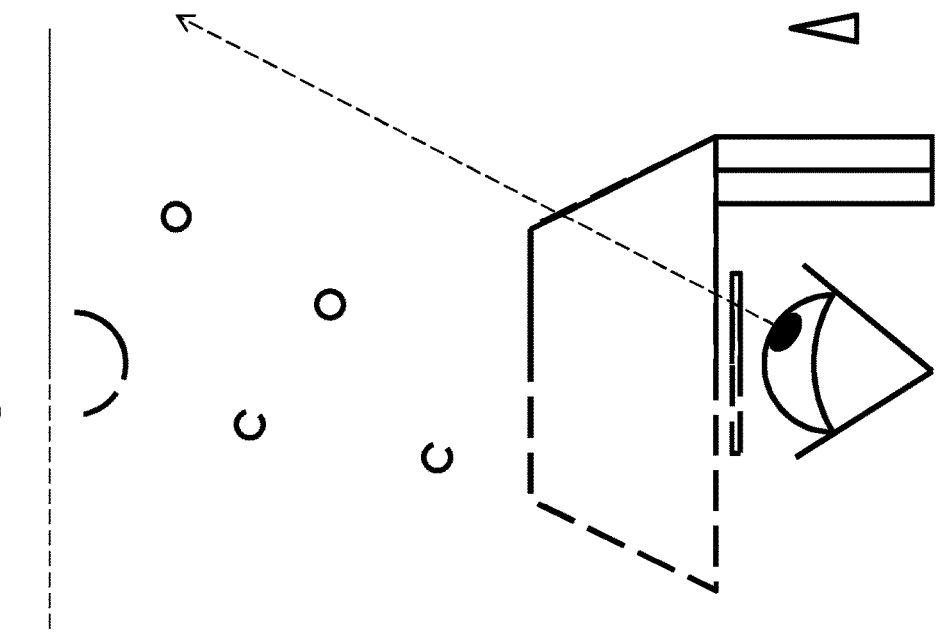
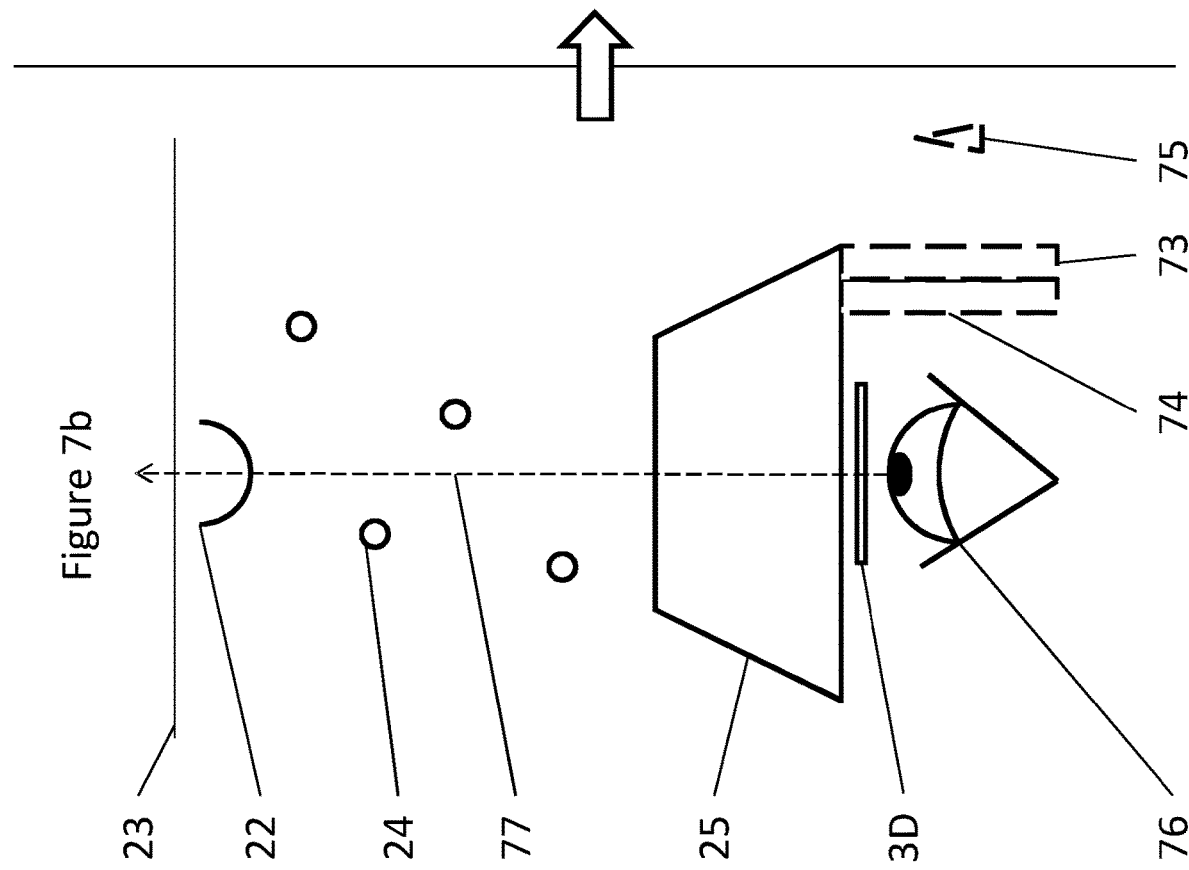

COMPOSITING AN IMAGE FOR DISPLAY

CROSS-REFERENCE TO RELATED APPLICATIONS

This application is a U.S. national stage application under 35 U.S.C. § 371 of International Patent Application No. PCT/GB2017/052642, filed on Sep. 8, 2017, which claims the benefit of Great Britain Patent Application No. 1616229.9 filed on Sep. 23, 2016, the contents of each of which are incorporated herein by reference in their entirety.

BACKGROUND

Virtual Reality is increasingly used in gaming in order to produce a more immersive play experience, but conventional virtual reality systems require a wired connection between the virtual reality headset and the host on which display data is produced. This is very inconvenient and likely to break immersion as well as potentially presenting a danger to the user, as he or she is unaware of the location of the cable.

Furthermore, conventionally the host must re-compose each frame every time the view is refreshed, which would cause a serious problem if a wireless connection having a limited bandwidth were to be used.

The present invention therefore seeks to at least mitigate these problems.

SUMMARY

Therefore, according to a first aspect, the invention provides a method for compositing display data at a remote device to form an image for display, the remote device receiving elements of the image for compositing from a host device over a transmission channel, wherein the image comprises at least display data forming a background layer, display elements forming one or more foreground layers and an overlay data layer, the method comprising:
  receiving sensor information indicating one or more of:
    a position of an eye of a viewer;
    a direction of focus of the eye of the viewer; and
    a position of a display;
  determining movement of a line of sight between the eye of the viewer and the display;
  determining an estimate of a future position of the line of sight at a future time based on the determined movement of the line of sight;
  determining an adjustment to be made to the image based on the future position of the line of sight, the adjustment comprising a change of at least one of:
    the display data forming the background layer,
    the display elements forming the one or more foreground layers, and
    a location of the display elements relative to the display data;
  compositing the display elements of the at least one foreground layer relative to the display data of the background layer according to the determined adjustment; and
  forwarding the composited image for display on the display at the future time.

According to a preferred embodiment, the movement of the line of sight between the eye of the viewer and the display is determined relative to any one of:
  a virtual frame of reference in the image being displayed; and
  an external frame of reference in which the viewer and the display are physically located.

Preferably, the sensor information includes one or more of:
  data indicating movement of the viewer's head;
  data indicating movement of the display;
  data indicating a direction of focus of the eye of the viewer; and
  data indicating a distance between the eye of the viewer and the display.

In one embodiment, the method further comprises:
  determining, based on the determined adjustment whether the changed display data and/or changed display elements are available at the remote device for compositing;
  if it is determined that the changed display data and/or changed display elements are not available at the remote device for compositing, obtaining the changed display data and/or changed display elements from the host device over the transmission channel.

Preferably, the foreground layers may include a middleground layer between the background layer and the one or more foreground layers.

Preferably, each of the display elements may comprise a discrete portion of the image forming an independent element that can be translated or transformed as a unitary object.

The method may further comprise:
  sending one or more of the sensor information, determined movement of the line of sight, and the estimate of the future position of the line of sight at a future time to the host device;
  receiving, from the host device, display data and/or display elements that the host device determines may be needed for compositing into an image at a future time.

The remote device is preferably configured to be worn on the head of the viewer, and may comprise a set of glasses or a headset. Preferably, the headset is a virtual reality headset, or, preferably, the set of glasses is an augmented reality set of glasses.

In a preferred embodiment, there is provided a remote device configured to perform all the steps of the above described method.

According to a second aspect, the invention provides a method at a host device to facilitate compositing an image at a remote device for display, the method comprising:
  transmitting elements of the image for compositing to a remote device over a transmission channel, wherein the image comprises at least display data forming a background layer, display elements forming one or more foreground layers and an overlay data layer, the method comprising:
  receiving, from the remote device, one or more of:
    sensor information, wherein the sensor information indicates one or more of:
      a position of an eye of a viewer;
      a direction of focus of the eye of the viewer; and
      a position of a display;
    a determined movement of a line of sight between the eye of the viewer and the display, and
    an estimate of a future position of the line of sight at a future time based on the determined movement of the line of sight;
  wherein, if the estimate of a future position of the line of sight at a future time is not received from the remote device, but the sensor information is received from the remote device, the method further comprises, at the host device, determining movement of a line of sight between the eye of the viewer and the display, and determining an estimate of a future position of the line of sight at a future time based on the determined movement of the line of sight, and wherein if the estimate of a future position of the line of sight at a future time is not received from the remote device, but the movement of a line of sight between the eye of the viewer and the display is received from the remote device, the method further comprises, at the host device, determining an estimate of a future position of the line of sight at a future time based on the determined movement of the line of sight, determining an adjustment to be made to the image based on the future position of the line of sight, the adjustment comprising a change of at least one of:

the display data forming the background layer,
the display elements forming the one or more foreground layers, and
a location of the display elements relative to the display data;

determining, based on the determined adjustment whether the changed display data and/or changed display elements are available at the remote device for compositing; and if it is determined that the changed display data and/or changed display elements are not available at the remote device for compositing, transmitting the changed display data and/or changed display elements to the remote device over the transmission channel.

Preferably, the sensor information includes one or more of:

data indicating movement of the viewer's head;
data indicating movement of the display;
data indicating a direction of focus of the eye of the viewer; and
data indicating a distance between the eye of the viewer and the display.

Preferably, the foreground layers may include a middle-ground layer between the background layer and the one or more foreground layers.

Preferably, each of display elements may comprise a discrete portion of the image forming an independent element that can be translated or transformed as a unitary object.

In a preferred embodiment, there is provided a host device configured to perform all the steps of the above described method.

According to another aspect, there is provided a system comprising a host device and a remote device as described above connected to the host device, which may comprise, but need not comprise, the host device as described above.

According to a possible further aspect of the invention, there is provided a method of compositing frames on a display control device based on sensor feedback, comprising:

1. Receiving sections of image data
2. Receiving sensor data indicating a "camera" location and angle
3. Determining the required view
4. Composing one or more frames to produce the required view
5. Forwarding the finished frames to one or more display devices A section of image data is display data which can be combined with other display data in order to form a finished image. An example of a section of image data is an icon or sprite, which is a small image that can be combined with a background. Preferably, the sections of image data are full-frame layers which have transparent elements and can be placed in an order to give an impression of depth between them where they overlap with one another. For example, there may be a background layer, a middle layer, and a foreground layer, where non-transparent data in the middle layer obscures the background layer and they are both obscured by any non-transparent data in the foreground layer. Furthermore, it is beneficial for the sections of image data to be editable independently of one another.

Different levels of image compression may be used on different layers. This may be to take advantage of the fact that layers which appear to be further from the user will not be shown in great detail, but is more likely to be used to take advantage of the fact that some layers may be moving and therefore can be slightly blurred or otherwise distorted without affecting the user experience. This will allow compression to be applied more efficiently, and therefore allow more efficient use of limited bandwidth.

Knowledge of the "camera" location and angle can also be used to apply compression; if the user is looking in a particular direction—this dictating the "camera" location and angle—then sections of display data, or parts of sections, not in the current view can be more compressed and subsequently healed to perfect. As part of this healing, or as the result of new image data being generated, a part of a section of image data may be updated independently of the rest of the section: for example, the edges of a layer may be updated while no change is made to the centre of the layer.

Sensor data can include input from sensors such as eye trackers, accelerometers, gyroscopes, or compasses, or other input devices, including human interface devices such as mice, keyboards, touchscreens, joysticks, and buttons. This can be used to detect movements by the user, as well as potentially the user's location in physical space. Furthermore, it can be used by the user to interact with virtual surroundings such that, for example, pressing a physical button causes a change in the display data presented.

If the system is presenting a virtual environment, as is the case in, for example, virtual reality systems, information received from sensors regarding the movements of the user can then be used to determine the user's position in the virtual space, as well as his or her viewing angle, these factors being assigned to the "camera" as aforementioned. This allows the required view to be determined.

A view is a particular viewing angle within the virtual environment that determines the sections of image data that should be used in composing frames and the way in which they should be composed. For example, a gyroscope may detect that the user has turned his or her head to the right and raised it, and eye trackers may detect that he or she is looking upwards. The view is therefore upwards and to the right of the user. Appropriate sections of image data can then be used to compose finished frames showing this view.

There may be more than one frame as in virtual reality systems it is common to present views to the user using two small display panels, one in front of each of the user's eyes. The two display panels will display slightly different frames in order to create an impression of stereoscopic vision and therefore the illusion that the user is viewing a three-dimensional scene or object.

Since the sections of image data should be independently editable and since they are composed into frames at the last moment, they should be able to move within the view independently of one another. This is why layers are preferable, as a layer can appear to move over a layer 'behind' it when prompted to do so by sensor input such as movement of a controller. Naturally, a user may have different interactions with different layers such that different sensor or human interface inputs result in different reactions from the different layers. For example, there may be a layer that acts as a static frame of reference, which will reduce the effects of motion sickness for the user, but in conventional systems would result in a requirement for frequent re-composition and re-transmission of frames. The fact that this layer can move 'over' layers behind it will reduce the re-rendering required for small movements.

In addition to this, particular views may be pre-rendered for display at short notice—for example, a buffer around the frame actually being viewed by the user may be generated so that if the user turns his or her head the appropriate data will be available immediately, without having to be specially rendered, as this could introduce lag. The views to be pre-rendered could be uniform, or could be determined through the use of sensor data and ergonomic prediction techniques, such as an assumption that if a user is turning his or her head to the left at a steady speed, he or she will continue to do so and therefore no display data to the right needs to be pre-rendered.

As an extension of this technique, there may be pre-prepared images provided which intervene as separate layers between the layers that are constantly in place such that all the data comprising layers 'behind' the image can be discarded when the pre-prepared image is used. This means that no change to the layers is needed in order for a full-screen event to occur. In a computer animation context examples may include a title screen or a pre-generated event such as a video clip, and as such a pre-prepared layer may also include other sensory output such as audio or tactile output.

According to a still further aspect of the invention, there is provided a display system which uses the above method and incorporates appropriate hardware for carrying it out, including:
1. Means for receiving sections of image data
2. Memory for storing sections of image data
3. Sensors capable of providing feedback to a processor
4. A processor for receiving feedback and compositing sections of image data into one or more frames
5. Means for transmitting the frame or frames to the display device or devices This system may be, for example, a virtual reality headset connected to a games system, or a pair of augmented reality glasses connected to a mobile device, or a 3D television connected to a video player. In the former examples the display output will consist of two small displays, one associated with each of the viewer's eyes, and in the final example the display output will consist of a single display which displays two frames simultaneously such that the user can view them through, for example, appropriately-polarised lenses. All of these examples require two frames in order to produce the illusion of three dimensions as previously mentioned.

These examples assume that the system is used to create a stereoscopic display. Alternatively, it may consist of a host such as a games system or video server connected to a single portable display such as the integral screen of a mobile phone, which can then be moved around to show different views according to input from sensors in the mobile phone. This would only require one frame, but the same methods could be used as for a stereoscopic system. It should also be noted that the term "eye" as used herein refers not only to a natural eye, but also to partly or wholly artificial eyes, such as a "bionic" eye.

BRIEF DESCRIPTION OF THE DRAWINGS

Embodiments of the invention will now be more fully described, by way of example, with reference to the drawings, of which:

FIG. 5b shows a further detail of the displays shown in FIG. 5a;
FIGS. 7a-7d show an example of a predicted view and changes in the displayed image due to a change in line of sight.

DETAILED DESCRIPTION OF THE DRAWINGS

Figure 1:
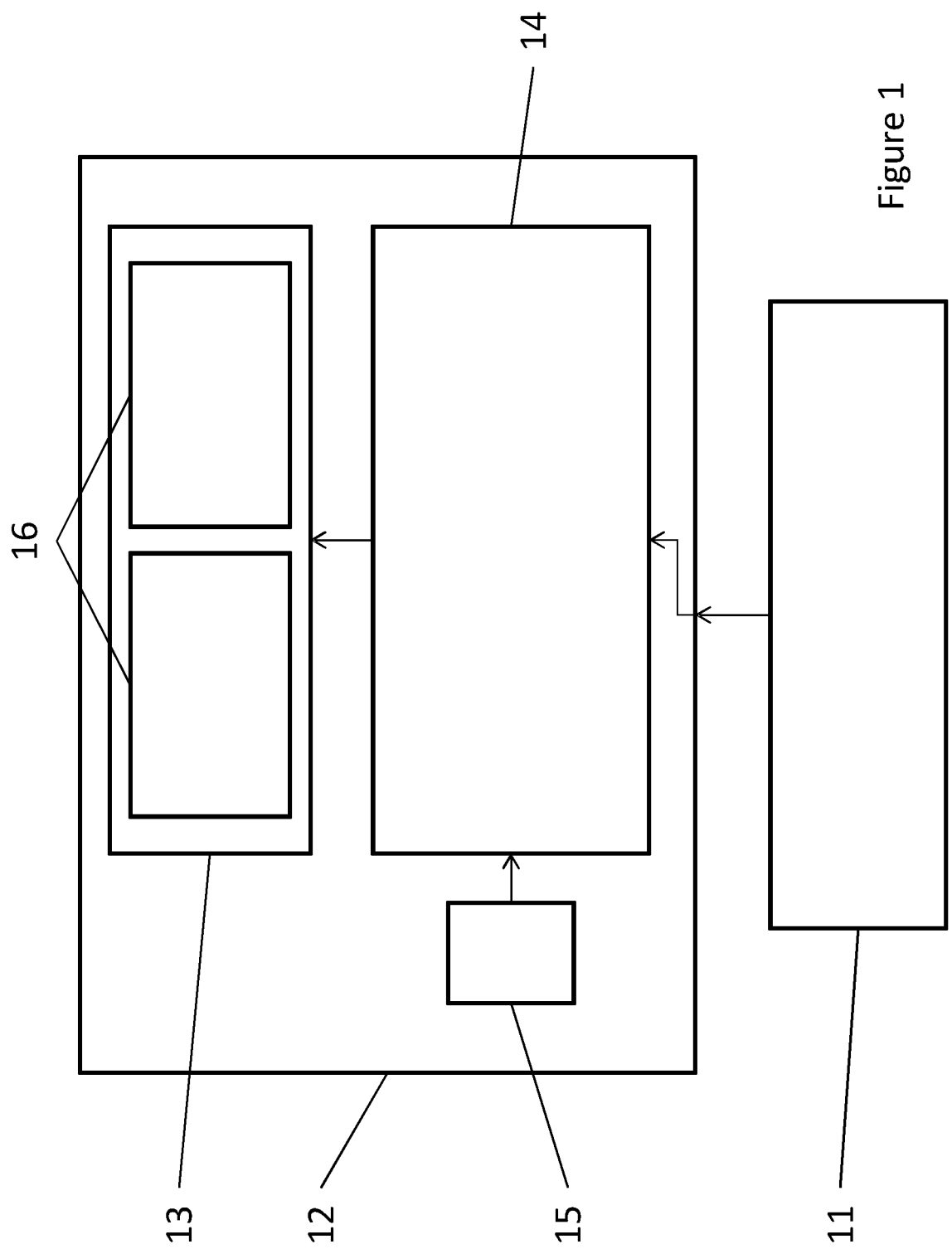
FIG. 1 shows an overview of a system according to one embodiment of the invention.

FIG. 1 shows an overview of an example embodiment of a system according to the invention, showing a virtual-reality headset [12] connected to a host device [11], such as a gaming console using a connection that may be wired or wireless, or even over a network such as the Internet, but is preferably wireless. The headset [12] incorporates a remote compositor [14], a collection of sensors [15], and a set of goggles [13], which incorporates two eyepieces [16]. Each eyepiece [16] is a small independent display device which in use is positioned in front of the user's eye so as together to create an impression of stereoscopic—and therefore three-dimensional—vision.

The compositor [14] is a processor which may comprise a general-purpose programmable processor, which may in turn be multi-core, or a collection of one or more specially-designed hardware processors. In any case, it receives display data and outputs two frames of composited image data, one of which is destined for each eyepiece [16] in order to make up a view.

The sensors [15] collect information on the outside world and the user's movements, and may include gyroscopes, accelerometers, etc. incorporated into the headset [12] to detect movements such as the user turning or tilting his or her head, as well as eye-tracking sensors to detect eye movements and direction of focus. Other sensors to detect other body movements may also be provided and connected to the headset [12] either wired or wirelessly, and this input also incorporates other possible sensors that might be useful to tailor the images shown to the user to his or her movements and/or environment.

Figure 2:
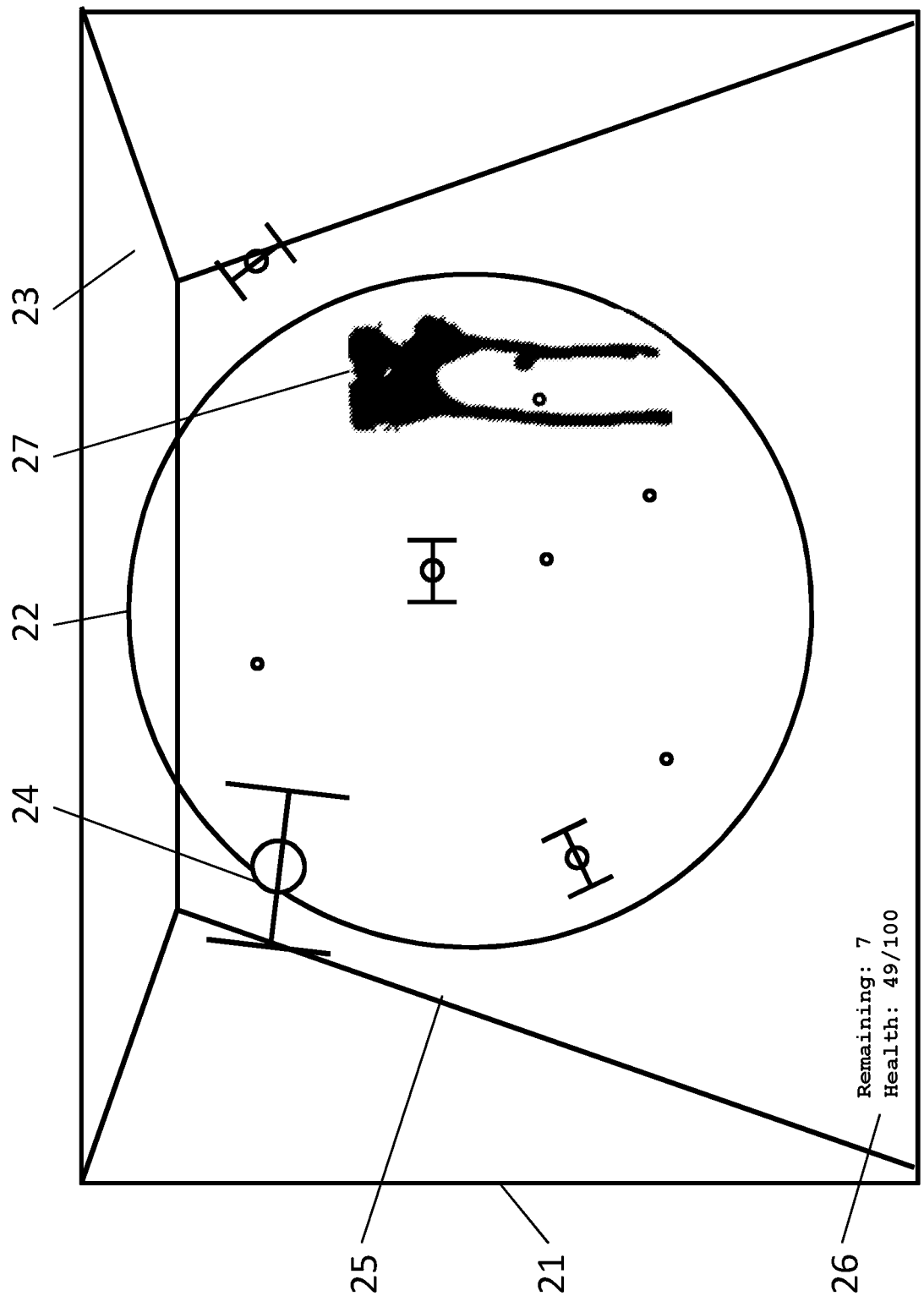
FIG. 2 shows an example of an image view that may be displayed by the system of FIG. 1.

FIG. 2 shows an example of a view presented to the user. As previously mentioned, this view will actually be presented as two frames, one shown to each of the user's eyes to create an illusion of three dimensions. However, for simplicity only a two-dimensional view is shown in FIG. 2.

In this example, the view is an image from a spaceship-based combat computer game. Using the eyepiece [13], the user can see the interior of his or her spaceship's cockpit [25], a number of enemy spaceships [24], and, in the background, a planet [22] with space [23] beyond. The user is also presented with a heads-up display [26], the example here being a count of the number of enemy spaceships remaining and a notification of the user's health level. The view also includes a blood splatter [27] on the 'inside' of the user's 'visor'.

Figure 3:
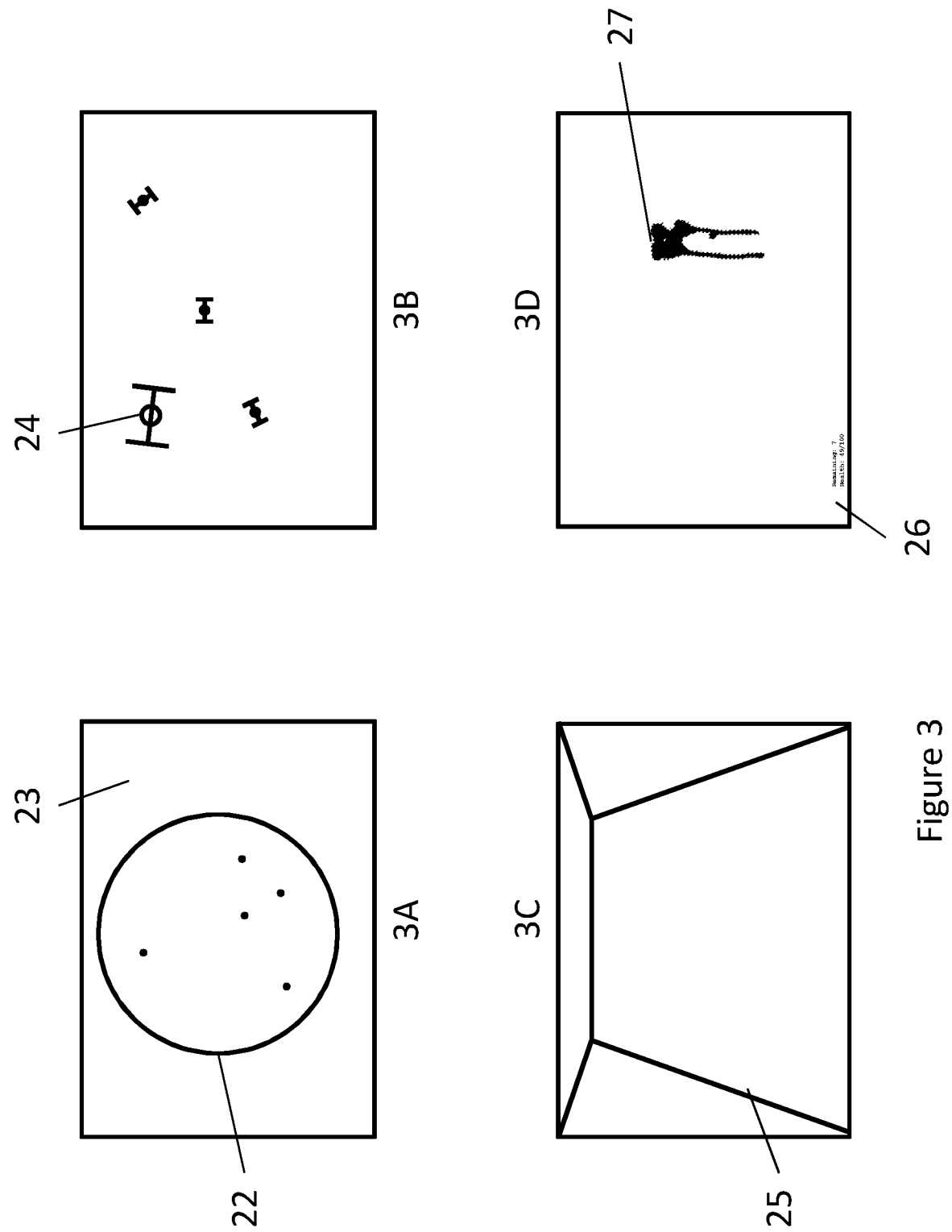
FIG. 3 shows image layers making up the view in FIG. 2.

This view may have been generated by the host [11] in four layers, for example, as shown in FIG. 3. Each of them may contain one or more discrete elements of the finished image. They are described as follows:

Background layer (FIG. 3A): the parts of the image at infinity, which are behind the other layers and unlikely to move significantly themselves, though the user may view different parts of the sphere. In this example, the Background layer [3A] consists of the planet [22], including lights on the planet, and space [23]. The sphere may include surrounding space and other planets, which will become visible when the user moves his or her head. The image data in this layer is likely to be completely static, with the possible exception of small changes such as flashing lights on the planet, distant moving objects such as shooting stars, etc. It is the only layer which should not include any transparent data.

Moving Middleground Scene layer (FIG. 3B): the parts of the image that move on top of the background but entirely independent of the user. In this example, the Moving Middleground Scene [3B] consists of the enemy spaceships [24], which move in accordance with instructions from the host [11], regardless of the movements of the user apart from direct interactions with the game controls (for example, launching a missile may destroy a spaceship) and extreme movements that will completely change the angle from which the user is viewing the objects in the layer, for example flying around them. This sphere may include further spaceships outside the current view, and may also include other moving objects such as asteroids and allied spaceships.

Moving Foreground layer (FIG. 3C): the parts of the image that move on top of the Background [3A] and Moving Middleground Scene [3B], which are controlled by the user directly but do not move relative to the user unless the user moves (for example, turning his or her head). In this example, the Moving Foreground [3C] consists of the player's spaceship cockpit [25], shown by the edges of cockpit windows in FIG. 2 or 3 but possibly including controls and internal screens in other parts of the sphere. The user could interact with this layer, and if the user remains still then the part of the image represented by this layer will not move relative to the user regardless of movement in the layers beyond [3A, 3B].

Static Foreground Overlay layer (FIG. 3D): the parts of the image that move with the user's movements as an overlay on the rest of the image, such that they occupy a fixed location in the user's field of vision. In this example, the Static Foreground Overlay [3D] consists of a blood splatter [27] and a head-up display [26] showing the player's remaining health and the number of enemy spaceships remaining, both of which are represented as being on the player's visor. These will not move relative to the user, even if the user moves, such that if the user turns his or her head the images in the Static Foreground Overlay [3D] will move over the layers behind it [3A, 3B, 3C]. Smaller movements that nonetheless change the line of sight, such as eye movements, may result in the user seeing other parts of this layer, but the layer as a whole remains stationary.

All the layers may be represented as transparent and opaque image data, and this is most likely for the Background layer [3A]. Alternatively, a layer may be represented by, for example, a collection of sprites and the locations in which they are to be displayed, which may act as entirely independent display elements. This would be useful for the Moving Middleground Scene [3B], as a single sprite of a spaceship—perhaps a three-dimensional wireframe allowing it to be rotated—could be stored together with the locations at which different spaceships are to be displayed and their relative sizes so that the sprite could be translated and transformed. This would allow the Moving Middleground Scene [3B] to be generated on the fly in almost any configuration involving those sprites.

Furthermore, one or more layers may be represented by a two-dimensional image buffer rather than a surround buffer. For example, since the Static Foreground Overlay [3D] moves with the user and he or she will not need to be able to see the interior of a 360° sphere, it might be a more efficient use of memory to store this layer as a pair of two-dimensional buffers, one associated with each eye.

Storage formats for different layers and number of buffers per layer may be combined in any way that may be appropriate or most efficient, depending on the exact embodiment.

Figure 4:
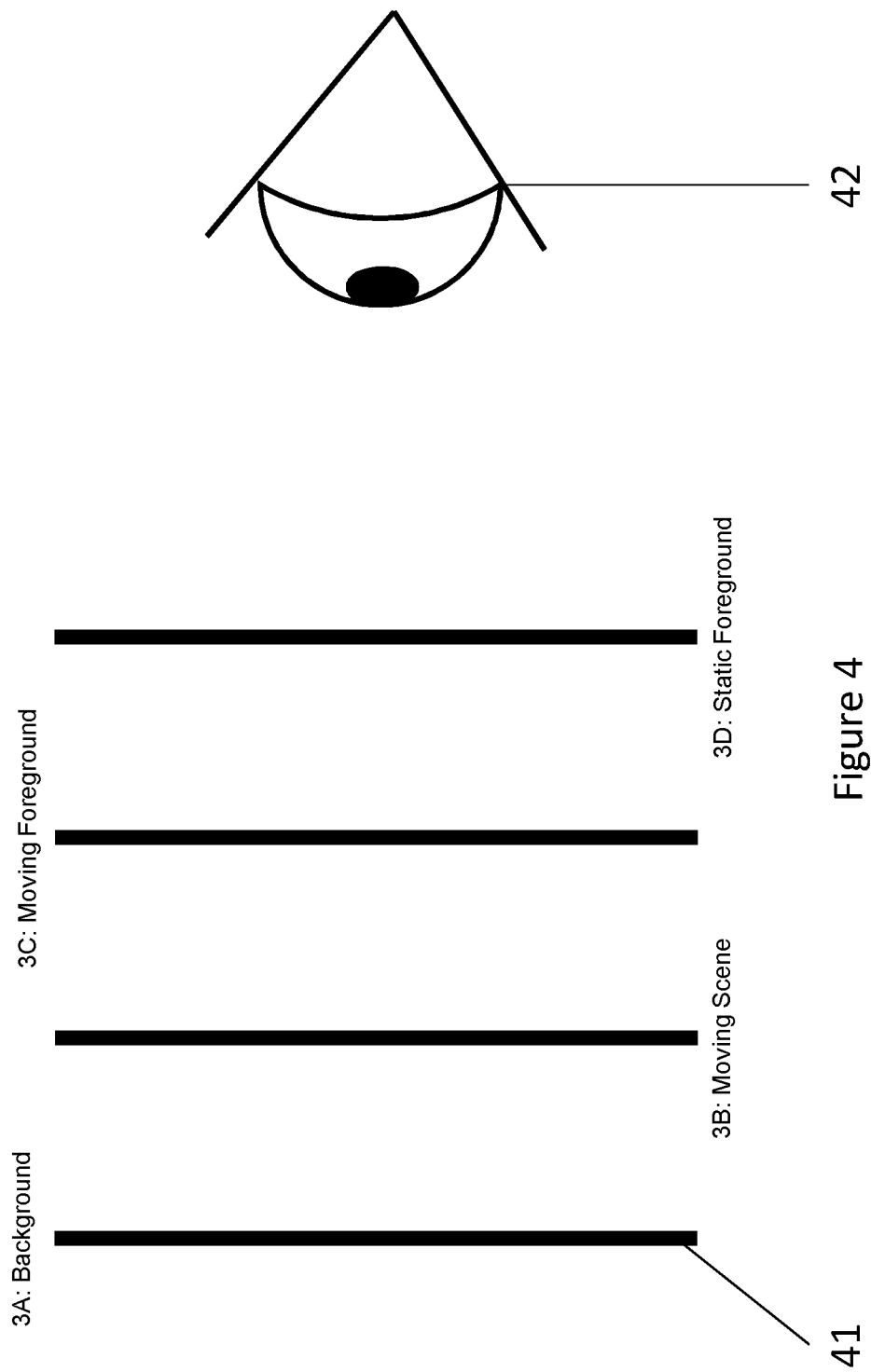
FIG. 4 shows a virtual arrangement of the layers relative to a user.

The build-up of the layers relative to one another to produce the final view is shown in FIG. 4. The scene is shown side-on with the layers [41] in front of one another relative to the user's eye [42]. The Static Foreground Overlay layer [3D] is closest, followed by the Moving Foreground layer [3C], the Moving Middleground Scene layer [3B], and the Background [3A], in that order. The user sees each layer 'closer' to him or her than the layer pictured to its left, and as such if image data from a layer occupies the same position in a frame as image data in a layer 'above' it, the 'upper' layer has priority and the image data will be blended accordingly.

Figure 5A:
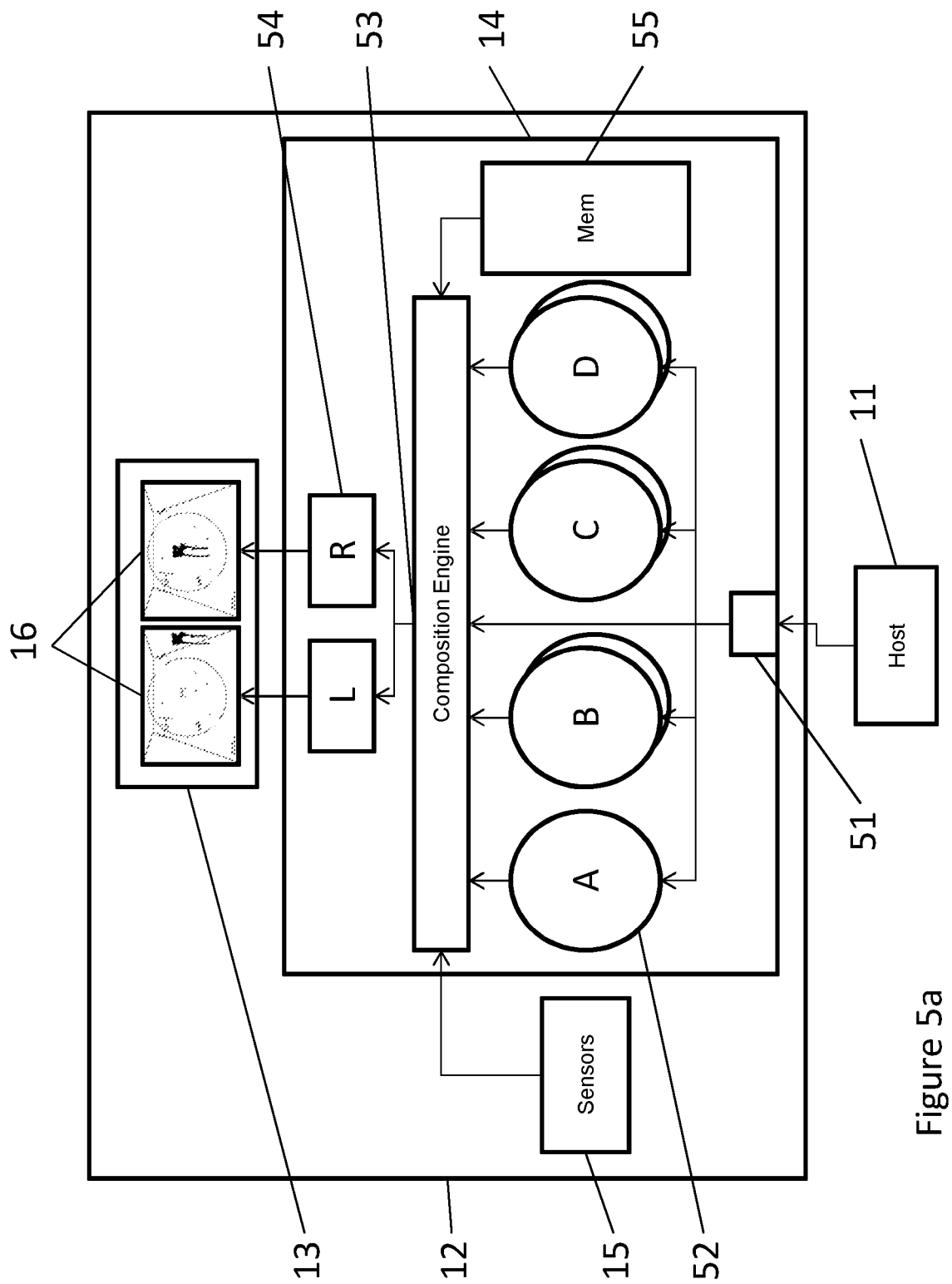
FIG. 5a shows a detailed view of a virtual reality headset that may use the system of FIG. 1.

FIG. 5 shows a detail of the compositor [14] from FIG. 1, showing four surround buffers [52], a second memory [55] and two finished frame buffers [54].

As in FIG. 1, a host device [11] is connected to a headset [12] which incorporates a compositor [14], a collection of sensors [15], and a pair of goggles [13] which includes two eyepieces [16], each of which is a separate, though coordinated, display device.

Data transmitted to the headset [12] from the host [11] is sent directly to the compositor [14], which receives it through an input engine [51]. This input engine [51] is connected to four surround buffers [52] and a composition engine [53]. The surround buffers [52] are areas of memory that store all the image data comprising the display element or elements in each layer, arranged so that it forms, in this embodiment, the inside of a sphere, rather than the conventional rectangular canvas. Only a part of each sphere will be viewed at a time, but when each surround buffer [52] is complete it can provide a full 360° view of its respective layer. This makes it faster to produce a view in any direction around the user.

It is likely to be impractical to populate all the surround buffers [52] immediately upon connection, so it is likely that the host [11] will prioritise some data over others. This may mean, for example, only sending the display data in the area of each layer that will be required for composing the first view that the user will see, and sending the remainder during times when the connection is less busy. Sending the remaining data may mean sending and storing it at low resolution first and then healing it over time. At any stage one layer may be prioritised over another.

For example, the Static Foreground Overlay [3D] and Moving Foreground [3C] can be viewed in detail by the user as they appear to be nearby, and they must therefore have good quality. Conversely, the Moving Middleground Scene [3B] may be changing rapidly and the details are likely to matter less to the user, so display data for this layer could be sent at a lower resolution. Furthermore, if it is unlikely that the user will wish to look around, the majority of a surround buffer [52] could be empty or populated with low-resolution data without affecting the user experience.

This means that there may be circumstances under which the composition engine [53] does not have the display data it requires available. This may lead to lag and a poor user experience, so it is beneficial to obtain required data as early in the process of compositing a new frame or pair of frames as possible. This may involve transmitting a request for specific data to the host [11] as soon as it is determined that that data might be needed, or transmitting sensor data to the host [11] as well as the composition engine [53] to allow the host [11] to determine whether more display data might be required and transmit it if so.

In this example, there are two surround buffers for each of the Static Foreground Overlay [3D, 52D], Moving Foreground [3C, 52C], and Moving Middleground Scene [3B, 52B], which may each be beneficially viewed stereoscopically and one for the Background [3A, 52A], which is at infinity and therefore will not require stereoscopic rendering.

The composition engine [53] is able to fetch data from any or all of the surround buffers [52] in order to create frames and for this purpose is connected to them. It is also connected to the sensors [15] in order to receive signals indicating movements by the user and other changes in the environment that will allow it to composite appropriate frames and predict the user's movements in order to pre-prepare image data. Results of user interaction such as pressing buttons on a joystick are likely to be received from the host [11], either as signals or as changed image data.

Finally, the compositor [14] contains an additional memory [55] for pre-set full-screen events. These might include, for example:

Explosion whiting out the screen beyond the Moving Foreground
'Game Over' screen
Shattering or obscured pilot's visor As suggested by the first example, a full-screen event may affect some layers and not others—in this case, the composition engine [53] will take image data from the Static Foreground [52D] and Moving Foreground [52C] surround buffers, but not the Moving Middleground Scene [52B] and Background [52A] surround buffers. Instead, it will blend the Static Foreground [3D] and Moving Foreground [3C] layers with data from the memory [55]. This is beneficial because the Static Foreground [3D] and Moving Foreground [3C] are less likely to change between views and may therefore be pre-blended and cached, even apart from the fact that less blending will be required because there are now fewer layers involved.

The full-screen events do not have to be spheres, but in some circumstances they may be. They may also include multimedia output, such as sound, vibration, electric shock for the use of a 'life', etc.

The composition engine [53] is further connected to two completed frame buffers [54], which are associated with the left and right eyepieces [16] respectively. Once the frames have been composed, the composition engine [53] sends the image data to the appropriate completed frame buffer [54], and it is then transmitted to the appropriate eyepiece [16] for display at the next display refresh.

Figure 5B:
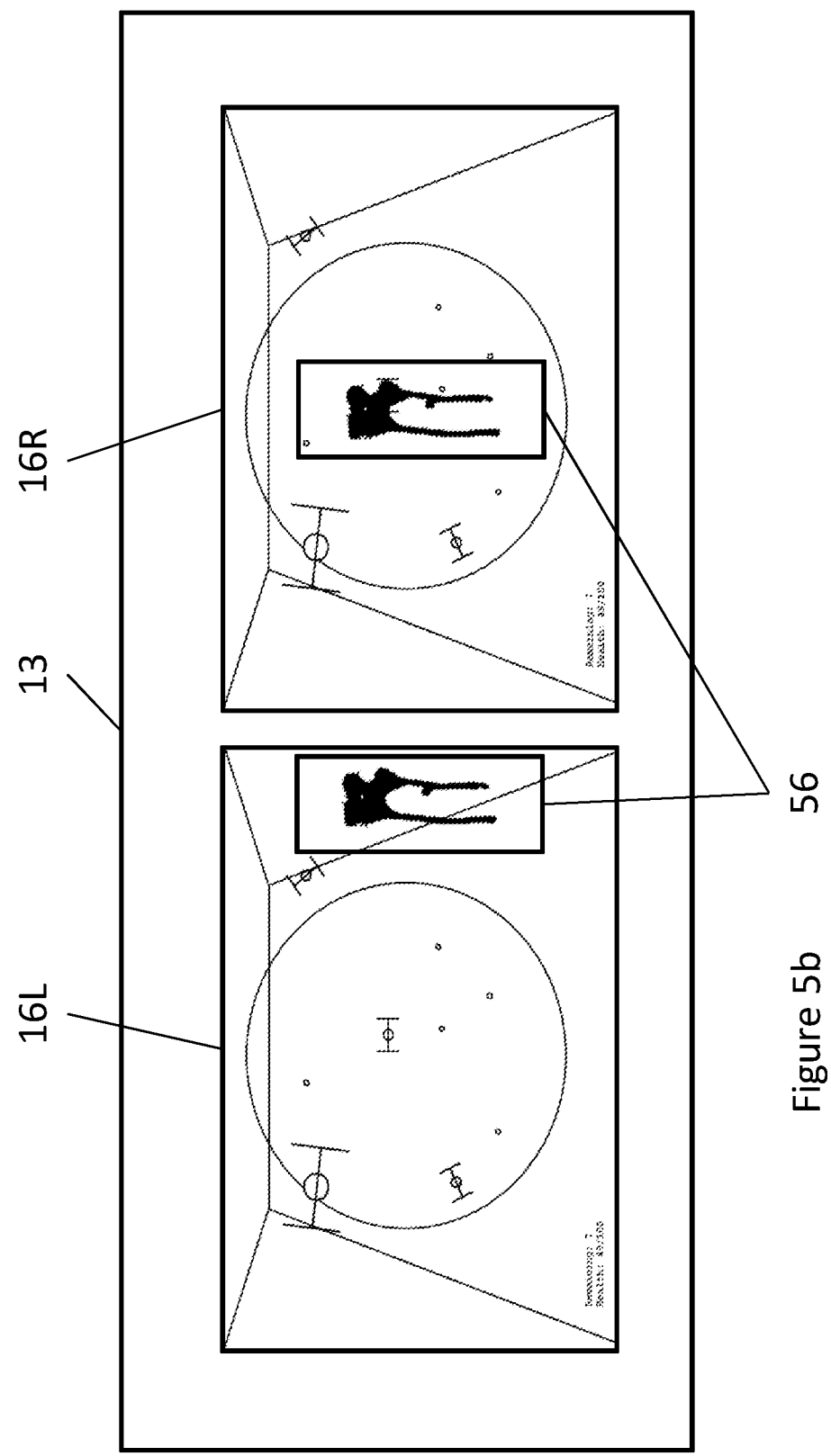

The eyepieces [16] show two frames which are different components of the same view and which are different from one another. FIG. 5b shows a detail of these frames, with the most noticeable difference highlighted with a box [56]. This is the position of the blood splatter [27] in the Static Foreground layer [3D].

As the layers progress and are located 'further' from the user, as shown in FIG. 4, the differences between the frames will be smaller in order to create the illusion of depth through stereoscopic vision. This means that the Static Foreground Overlay layer [3D] is likely to have the greatest difference between frames while the Background layer [3A] may have no difference between frames at all. The number of surround buffers per layer may reflect this, so there may be only one surround buffer [52A] for the Background layer [3A], but two for the others. This is the case in the embodiment shown in FIG. 5a.

This effect is shown in FIG. 5b, by the extreme difference in the position of the blood splatter [56] in the two frames: in the right-hand eyepiece [16R], it is positioned in the centre of the frame, directly in front of the user's eye. In the left-hand eyepiece [16L] it is positioned to the right of the frame, to reflect the fact that from the point of view of the user's left eye the blood splatter is located to one side.

Figure 6:
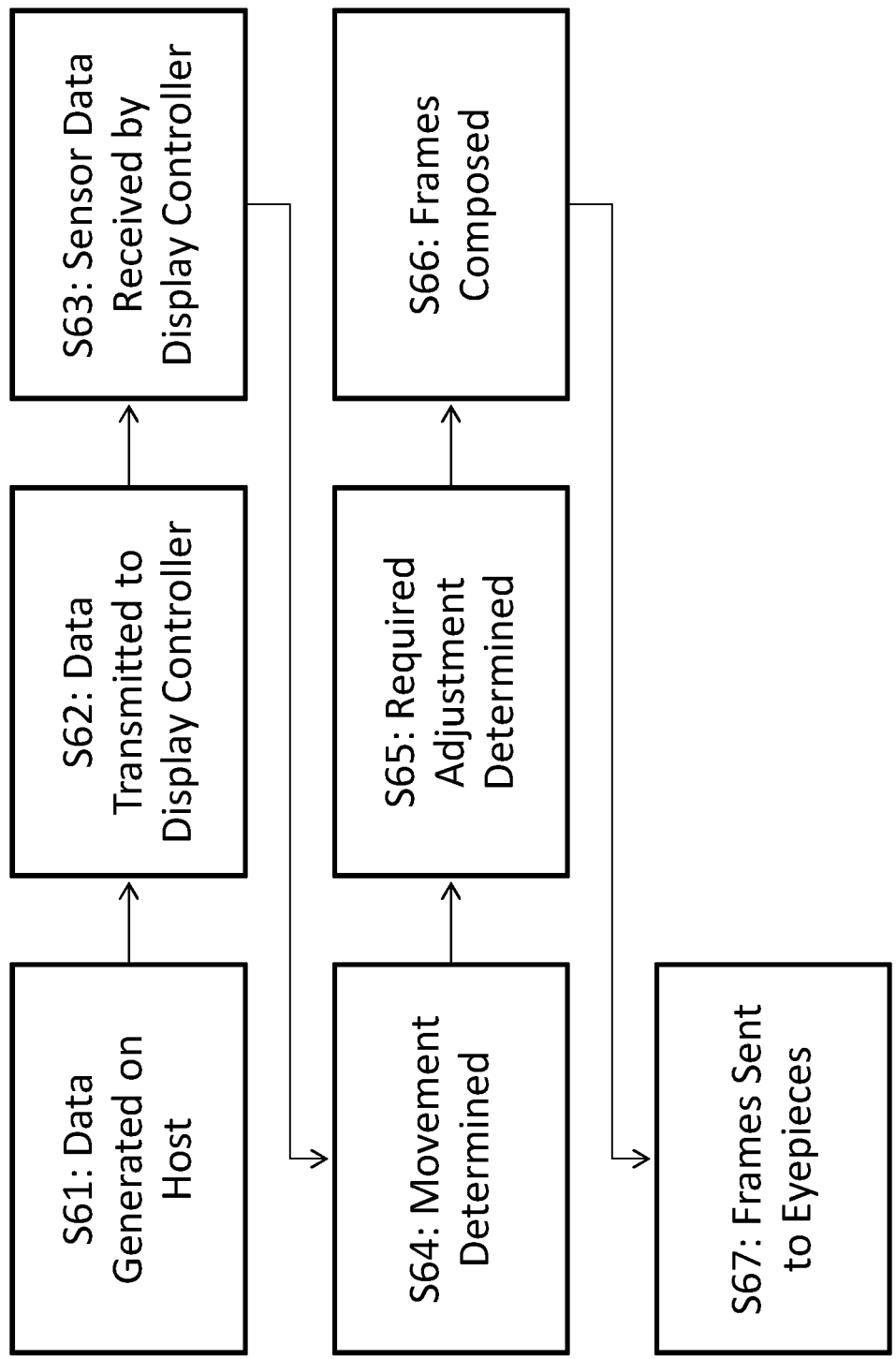
FIG. 6 shows a flowchart illustrating the method of compositing an image.

FIG. 6 outlines the process followed in producing frames for display in the system shown in FIG. 5.

At Step S61, the host [11] generates display data in layers, such as those shown in FIG. 3. Different layers may be generated by different parts of a single application, or by different applications, but in a gaming environment such as the embodiment described here are likely to be generated by a single application.

In some embodiments it could be possible for a separate application to supply display data to be incorporated into a layer. For example, alerts or a clock could be incorporated into the Static Foreground [3D] to be shown as a head-up alert in the player's vision.

At Step S62, the data is transmitted to the compositor [14] in the virtual reality headset [12]. It will be received by the input engine [51], which determines the nature of the data and its destination. The host [11] may transmit instructions and metadata to the compositor [14], which will also be received by the input engine [51] and transmitted directly to the composition engine [53] in order to change its behaviour. Display data, however, is identified as such by, for example, flags in a packet header, and is placed in the appropriate surround buffer [52]. The appropriate surround buffer [52] is determined by the input engine [51] by reference to the layer associated with the display data and the eyepiece [16] for which it is destined, and this information could also be stored in a packet header. Finally, the packet header could include a notification of each piece of display data's position in the sphere.

The same method could be used if there were a different number of surround buffers or layers to those shown in this embodiment, or if surround buffers were not used and the layers were stored as a number of two-dimensional frame buffers instead, or where a combination of methods are used—for example, the majority of the layers are stored in surround buffers, but the Static Foreground Overlay [3D] is stored as a two-dimensional canvas or pair of canvases.

Data could be marked with timestamps in order to ensure that the different layers are co-ordinated and thereby avoid layers which represent different times being composed into a single frame. Stored timestamps could be periodically updated even if there is no new data in order to ensure that layers are kept in step with one another. This is particularly important where predictive composition is used, as it will ensure that the movement of the displayed images will not get ahead of the user and thus avoid problems if the prediction of the user's movements turns out to be incorrect.

At Step S63, the composition engine [53] receives input from the sensors [15] indicating that the view displayed to the user should change. For example, the sensors [15] may include a gyroscope to detect rotation of the user's head. When the user turns his or her head to the right, thus changing his or her line of sight, the gyroscope sends a signal to the composition engine [53] to that effect, and the composition engine [53] will have to re-compose the frames displayed in the eyepieces in order to account for the fact that the user is viewing a different part of each sphere.

Similarly, re-composition could be required if the user moves his or her eyes to focus on another part of the view. This would be especially important where foveal processing or compression is used, such that areas on which the user is not focussed are shown as lower quality. In these cases, the view would have to be re-composed even though technically nothing had changed, as a different area of the view must be shown with high-quality image data while the original area of focus may be allowed to degrade, or even required to do so in order to more accurately reflect the focussing capabilities of the human eye.

The sensors [15] may also detect movement of the user's body that may indicate that he or she is moving within a virtual frame of reference. For example, if the user is running on a treadmill, he or she is not moving forward within the external frame of reference of his or her actual surroundings, but the images shown to him or her by the eyepiece [13] should change as he or she moves forward in the virtual world and thus his or her line of sight changes due to the change in the virtual position of his or her eye.

Preferably, the sensor input can be used not just to indicate that the view needs to change currently, but to enable the composition engine [53] to predict the user's movement and thus prepare frames ahead of time. This prediction is carried out at Step S64 and uses input from the sensors [15] regarding the user's most recent movements to predict his or her next movement: for example, if the user has been turning his or her head slowly to the right for the last two seconds at a steady pace, he or she is likely to continue doing so.

As previously mentioned, either the raw sensor data or the derived movement prediction may be transmitted to the host [11] to allow the host [11] to transmit any display data that it determines may be required for compositing the frame and that the compositor [14] does not already have.

At Step S65, the composition engine [53] calculates the adjustment required to the view based on the user's movement as determined at Step S64. This will also include determining the way in which each element of display data will change, and if it will in fact change at all. For example, if the user moved to the right without changing the direction of focus of his or her eyes or the angle of his or her head, the Background [3A] and Static Foreground Overlay [3D] might not require any change, the Moving Middleground Scene [3B] might shift slightly to the left relative to the Background [3A] and Static Foreground Overlay [3D], and the three-dimensional elements of the Moving Foreground [3C] might be transformed slightly such that they appear to be being viewed from a slightly different angle.

These adjustments can then be used by the composition engine [53] in composing the new frames.

In any case, the composition engine [53] will compose new frames for display at Step S66. In order to do this it will take display data from each surround buffer [52] in the location of the required view, which may be stored as a set of co-ordinates indicating the four corners of the view, as a single co-ordinate and a set of dimensions, or in any other appropriate format. It may compose one eyepiece's [16] frame before the other, or may compose them both in parallel in, for example, different processing cores. Finally, the composition engine [53] may in fact consist of two entirely separate pipelines, each serving one eyepiece [16].

Naturally, if the display data is stored in two-dimensional canvases in buffers, the composition engine [53] may just fetch the whole buffer for each layer.

A special case is the use of a pre-generated full-screen event from the memory [55] in the compositor [14], such as the explosion [84] shown in FIG. 8 and described below. The use of a pre-generated full-screen event could be triggered by a signal or command from the host [11], or by some other input such as user interaction with a controller or some particular sensor input. However, it is most likely that the host [11] will trigger the display of a full-screen event. The trigger could be in the form of a single-packet flag, which could be sent over the connection to the headset [12] very quickly, meaning that a pre-generated full-screen event could be shown with almost no delay. As for ordinary frames, the trigger may be sent and any composition performed prior to the frame containing a full-screen event being required, in response to predications of a user's movements—for example, a full-screen event representing a collision may be prepared if the composition engine [53] detects from the sensor data that the user is moving in the direction of a virtual object and determines that this movement is likely to continue—or any other stimulus.

The frames may also be re-composed if the compositor [14] receives a signal from the host [11] via the input engine [51] that the content of the display data has changed: for example, the spaceships [24] in the Moving Middleground Scene [3B] have moved. This will likely be accompanied by fresh display data showing the spaceships [24] in their new locations, though if the surround buffer [52B] for the Moving Middleground Scene [3B] is in fact represented by sprites and locations, the change may consist only of new locations for the spaceships [24].

Figure 8:
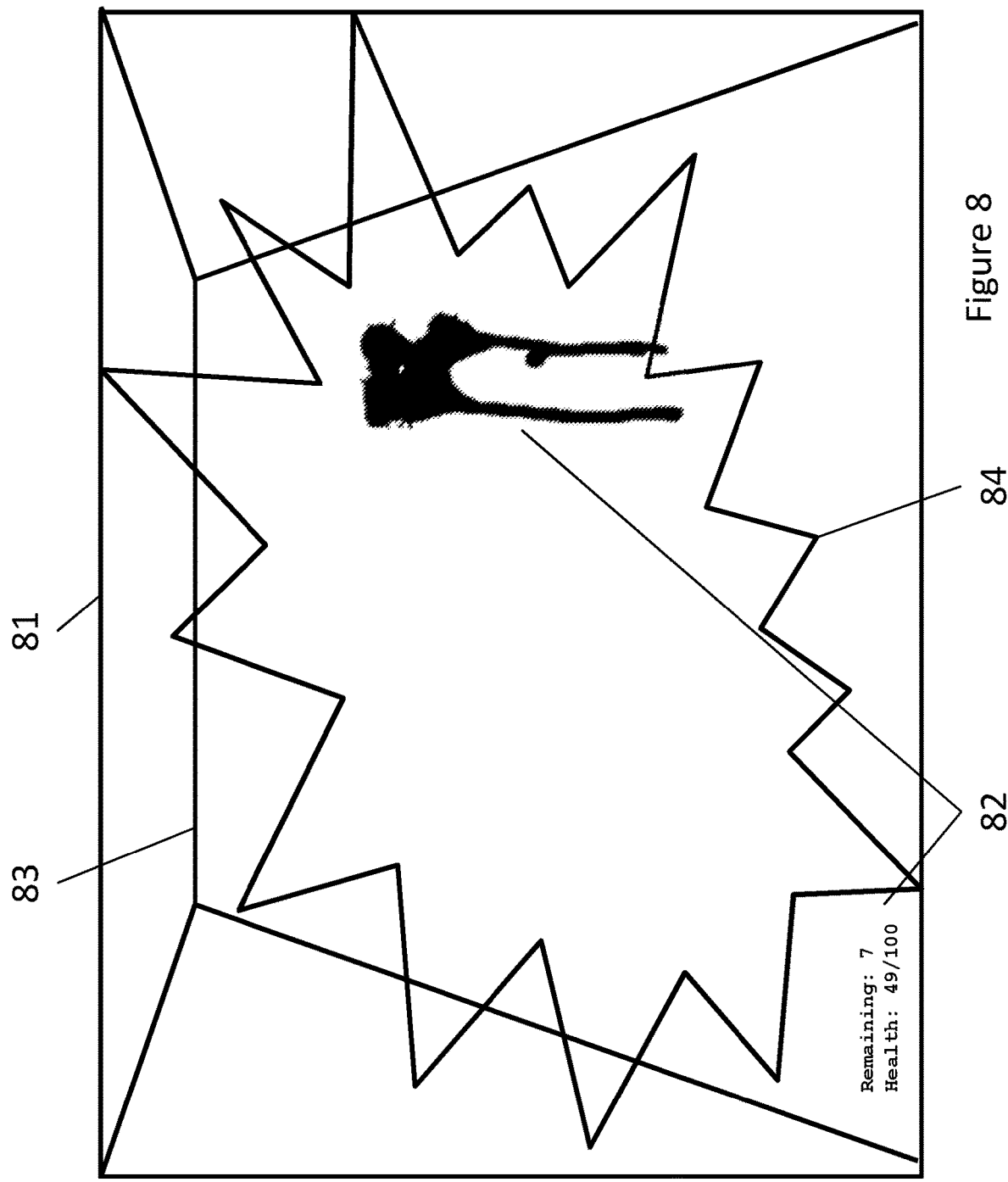
FIG. 8 shows an example of a pre-stored full-screen event.

In the example pictured in FIG. 8, the composition engine [53] will still fetch display data from the surround buffers [52C, 52D] associated with the Static Foreground Overlay [3D] and Moving Foreground [3C] layers, but will ignore the Moving Middleground Scene [3B] and Background [3A] layers. Instead of fetching display data from these surround buffers [52A, 52B], it will fetch the display data from the internal memory [55]. If there are multiple frames, it will fetch these in sequence, perhaps in accordance with timestamps or some other synchronisation methods. Simultaneously, other engines or processors may fetch the data associated with other output methods, such as an audio output fetching and playing a sound file of an explosion, and a tactile output receiving a signal to make the headset and any controllers vibrate. These outputs are not part of this process, however, and will not be further discussed.

In another example where all the layers are obscured, such as a "Game Over" event, the composition engine [53] might not fetch any data from the surround buffers [52] and only fetch data from the memory [55]. This could make blending entirely unnecessary as the display data could be placed directly in the completed frame buffers [54].

Full-screen events may also be partially transparent or consist of distortions to the main view, such as darkening or blurring of the edges of the view. This could usefully be applied during movement in order to reduce motion sickness.

The use of full-screen events of this sort can lead to a reduction in necessary processing and memory access both on the host [11] and in the compositor [14], as it means that no additional data needs to be transmitted to the compositor

[14], layers that will be obscured are not fetched or processed in any way, and no layers will need to be re-written when the event is over.

Having fetched the required data from the surround buffers [52] or memory [55], the composition engine [53] blends it in order to produce two frames which it places in the completed frame buffers [54] associated with the eyepieces [16]. This part of the process may include transforms on the data, such as scaling and rotation, which may be especially useful where the display data in a layer consists of sprites, as previously suggested.

Another possible transform is translation, which means copying a piece of display data from one part of a canvas to another. This could be especially useful for the Static Foreground layer [3D], as not only is this likely to have the largest change in the location of corresponding pieces of display data in different finished frames, as shown for example in FIG. 5b, but the objects [26, 27] in this layer are more likely to be two-dimensional, making them easier to copy without further transformation. The composition engine [53] could use knowledge of relative distance between layers or frames to apply translation on the fly, if appropriate.

A final example of a transform is perspective projection, which scales different parts of an image differently in order to give the illusion of some parts being located further away from the viewer due to their smaller size.

Having composed the frames, the composition engine [53] or an associated processor may apply further processing such as lens correction in order to account for the distortion caused by lenses provided to enable the user to focus on the eyepieces [16].

The data is then displayed on the display devices comprising the eyepieces [16] at Step S67.

Because of the use of layers, only the layer that has actually been affected by any change in the images to be displayed need be updated in memory. Not only does this reduce the number of accesses to memory required, which is beneficial because the bandwidth between the memory and the input engine or composition engine is a limited resource, but the fact that changed layers can be blended on top of or behind already-blended lower layers also reduces the amount of processing required to blend a frame. Furthermore, the use of this type of remote composition reduces the volume of data that needs to be sent over the limited-bandwidth connection between the host and the headset and the rate of update by the host. This means that the data can be transmitted more quickly and also allows for a lower-bandwidth connection to be used, potentially making it practical to provide a wireless headset. This will result in a safer and more convenient experience for the user. Finally, the use of such methods to reduce data transmission and processing will lead to lower latency in the production of finished frames, allowing for much faster updates and therefore a better user experience. Low latency is especially important in virtual-reality and augmented-reality systems.

The use of sensor data to enable the compositor to predict the view that will be required next as the user moves is also beneficial, as it will further reduce latency by allowing the frames to be updated apparently instantly by in fact compositing and preparing them slightly before they are required. The fact that composition is performed remotely means that not only do the frames not need to be composed in the host and transmitted for every frame refresh, but the sensor data can also be used locally within the headset.

Figure 7A:
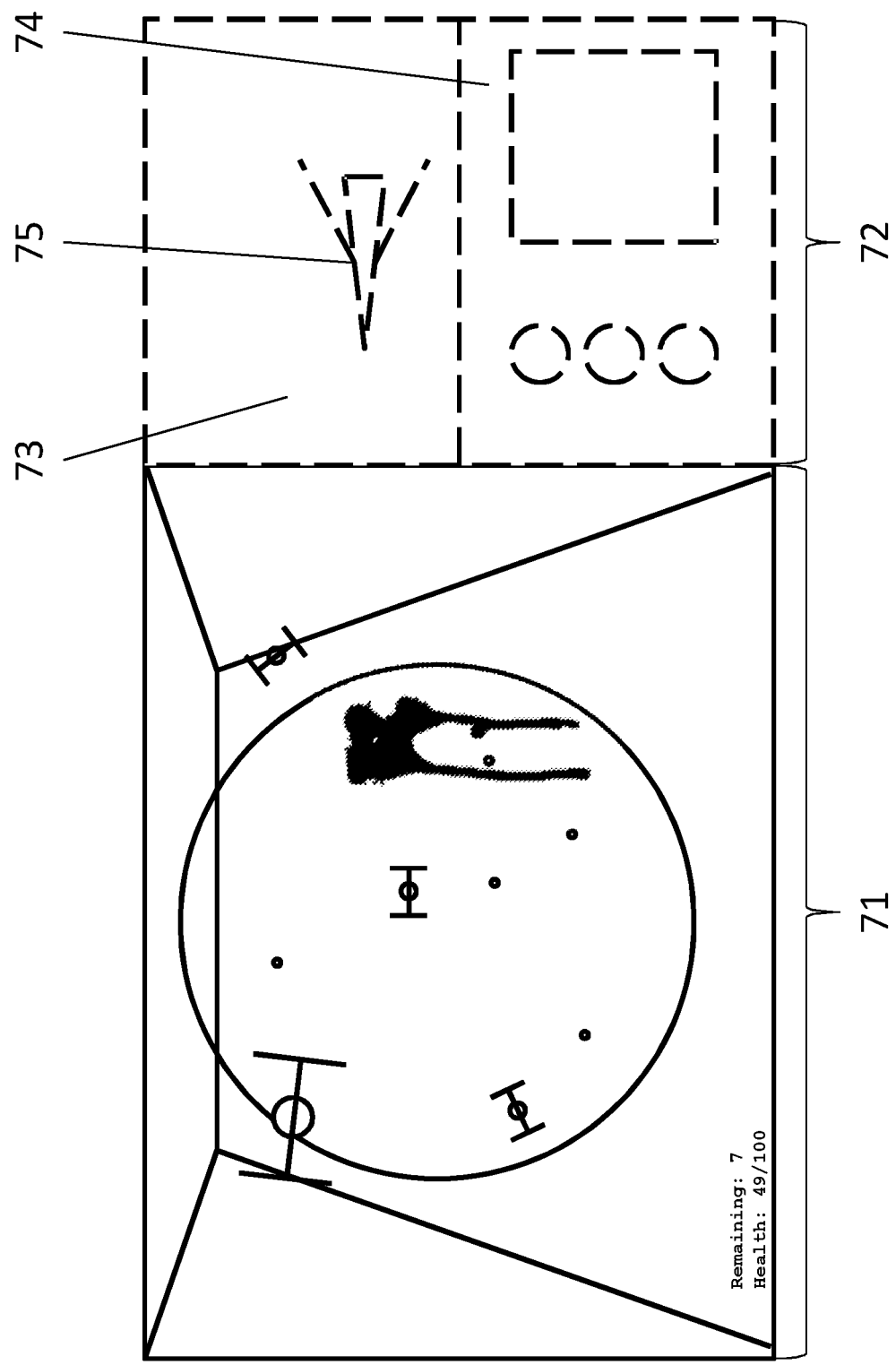

FIG. 7a shows an example of pre-preparing part of a view. This occurs when the composition engine predicts the movements of the user and composes some or all of the frame he or she will be moving to view, so that these views can be shown at once as the user moves. This example continues in FIGS. 7b, 7c, and 7d, which show a change in the user's line of sight causing the pre-prepared part of the view to become visible.

In FIG. 7a, the view described in FIG. 2 is shown in solid lines to indicate that it is currently visible to the user. However, there is also part of a similarly-sized view shown in dotted lines [72] to indicate that it is not visible to the user. This could be stored in a temporary buffer in the compositor [14], or along with part of the current view [71] in the appropriate completed frame buffer [54] to be sent to the display panels [16] for display at the next frame refresh.

The pre-prepared partial view [72] consists of an instrument panel [74] and a window [73], which shows space and an allied spaceship [75]. The view of space would be from the Background layer [3A], the instrument panel [74] from the Moving Foreground layer [3C], and the spaceship [75] from the Moving Middleground Scene layer [3B]. Because the Static Foreground Overlay layer [3D] would move with the user's head movement, this is not included in the pre-prepared view [72] and therefore some additional blending might be required before the view can be displayed, but the amount of processing required is reduced by this pre-preparation.

The Moving Foreground layer [3C] could also be added on a just-in-time basis to ensure that it is as up to date as possible.

The composition engine [53] or some other controller associated with the compositor [14] could determine whether and how to pre-prepare partial views according to any one or more of a number of heuristics, including pre-preparation of a uniform area around the current view or algorithmic prediction assuming that the user will watch moving objects, for example maintaining aim on an enemy spaceship, but the use of ergonomic movement prediction as described above is likely to give the best results and this method is overall preferred.

As an extension of this method, pre-prepared views could be cached so that, for example, the Moving Foreground and Background of the forward view described in FIGS. 2 and 3 could be cached as this is the direction the user is most likely to be looking for the majority of the game. This would mean that it could be displayed quickly if the user looks away and then back, even if this movement was unpredictable—for example, the user turns away and then suddenly glances forward.

FIG. 7b shows the user's line of sight [77] through the virtual surroundings as described in FIG. 7a. The user's eye [76] is shown at the bottom of the Figure, looking straight ahead through the layers as described in FIG. 3. The contents of the Static Foreground Overlay [3D]—the blood splatter and the head-up display—are closest to the user. Beyond, the cockpit window [25] comprises the visible part of the Moving Foreground layer [3C]. The enemy spaceships [24] and the planet [22] and space [23] are shown in the Moving Middleground Scene [3B] and Background [3A] respectively.

As described in FIG. 7a, the visible parts of the view [71] are shown with solid lines. There is also the pre-prepared part of the view [72], shown to the right of the user's eye [76] as the user will have to change the line of sight [77] by looking to the right in order to see it. This is also reflected by its position to the right of the visible part of the view [71] in FIG. 7a. As previously described, the pre-prepared view [72] includes an instrument panel [74] and window [73]

from the Moving Foreground layer [3C] and an allied spaceship [75] from the Moving Middleground Scene layer [3B].

Figure 7D:
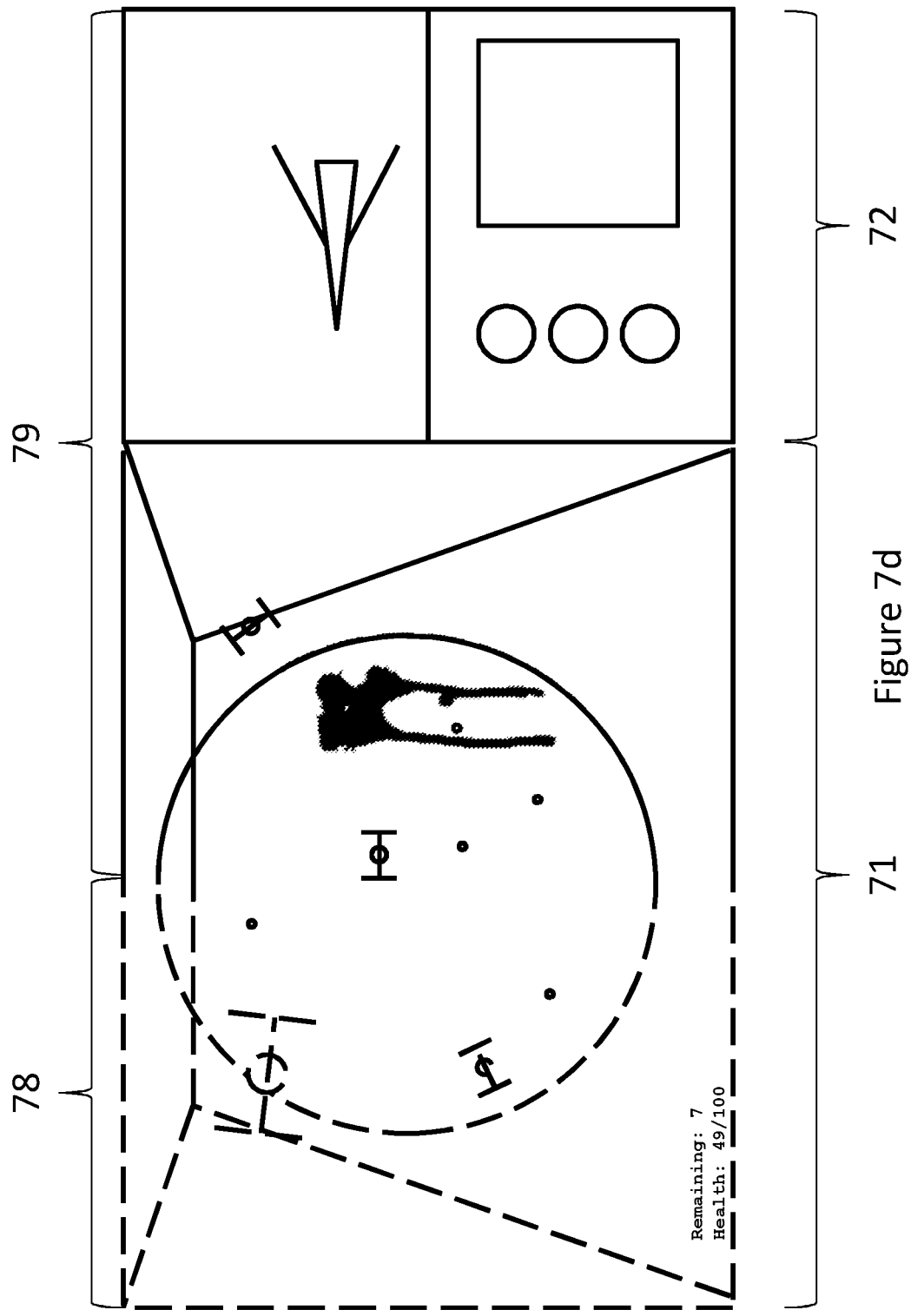

FIGS. 7c and 7d show the same components of the view, but the line of sight [77] has moved. The user is no longer looking straight ahead, but at an angle to the right, and so different parts of the view are visible [79]. As previously described, they are shown with solid lines while the parts of the view that are no longer visible [78] are shown with dotted lines.

As previously described, this adjustment to the displayed image may be carried out as soon as a movement of the line of sight [77] is detected, and it is preferably carried out slightly before the actual movement in order to display the new visible view [79] instantly when the user's line of sight [77] has moved to the new position as shown in FIG. 7c. The parts of the view which are no longer visible [78] may be retained if it is determined—through ergonomic movement prediction or another method—that the user is likely to look forward again, or they may be discarded if it is determined that the user is not likely to look forward again immediately.

FIG. 8 shows an example of a full-screen event, as previously mentioned. In this example, the images from the Static Foreground [82] and the Moving Foreground [83] are still visible and will act as normal, but the Moving Middleground Scene and Background layers are not visible as a full-screen event [84] has been interposed between the Moving Middleground Scene and Moving Foreground layers. In this example, the full-screen event is an explosion, which is therefore likely to be an event spanning a period of time, and may also be accompanied by other output such as sound, vibration, smell, etc. as permitted by the user interface.

The embodiment described herein, together with the number of layers, their storage formats, and the purpose for which the system of the embodiment is designed and used is an example only and does not limit the claims.

Figure 9:
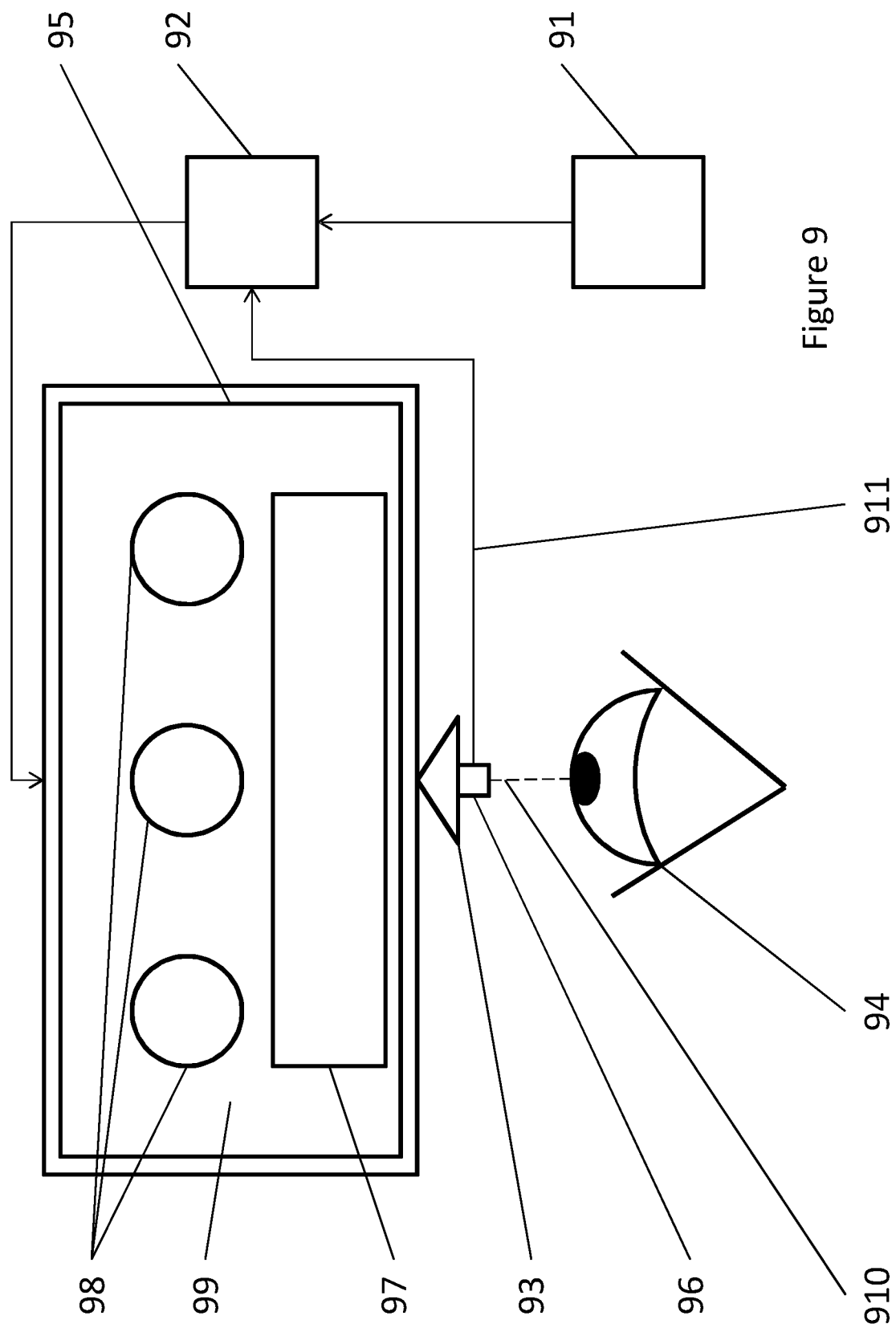
FIG. 9 shows an alternative embodiment of a system.

FIG. 9 shows an alternative embodiment of the invention which is not based on a headset but is instead an augmented-reality video-conferencing system. The diagram shows a large display device [93], which may, for example, occupy an entire wall to give the impression of a large room. It is connected to a display control device [92], which is in turn connected to a host device [91] such as a computer or general-purpose video-conferencing base station. The computer [91] will have a connection over which it receives external video data, though this is not shown. It may be to a network, including the internet.

There is also a focus tracker [96], which acts as a sensor and is accordingly connected to the display control device [92]. It detects the user's gaze and therefore line of sight of the display device [93], as well as the position and distance from the display device [93] of the user's eye [94], and this information is transmitted to the display control device [92] for use in generating the frame [95] to be shown on the display device [93]. In this embodiment, it is attached to the display device [93], but in other embodiments it might be elsewhere.

The display device [93] is showing a frame [95] which has been composited by the display control device [92] as previously described. It was composited from three layers: a background [99] which may, for example, be a generic office room, images of other participants in the video conference [98], which may be a single middle layer or may all be independent middle layers, and a foreground overlay [97], which may, for example, be a tabletop. Furthermore, the images of the other participants [98] may be video transmitted by their corresponding videoconferencing systems, or may be computer-generated as 3D sprites. The system will operate in much the same way in both cases.

Finally, the diagram shows a user's eye [94] focussed on the display device [93].

Elements of display data are received or generated at the host device [91]. This may mean receiving disparate elements of video data and treating them as a single layer for the purposes of composition, and sending it to the display control device [92] marked as such. Overall, for the purposes of this example, three layers are transmitted to the display control device [92]: the background [99], the middle layer [98], and the overlay [97].

The display control device [92] also receives [911] data from the focus tracker [96] which indicates the position and direction of focus of the user's eye [94]. The display control device [92] is able to use this information to determine movement of the user or his or her line of sight, and to amend its composition of the layers accordingly. Of course, the frame [95] displayed will also change based on changes in the display data sent to the display control device [92], for example if one of the other participants shown in the middle layer [98] moves.

If the display control device [92] does determine that the user's line of sight is moving—for example, he or she is walking across the room and the line of sight is therefore moving relative to an external frame of reference—it is able to estimate the future position of the line of sight and adjust its composition accordingly, for example preparing the next frame such that the user is viewing a different angle on the room shown in the background [99] and the other participants [98] are shown at a different angle relative to the desk shown in the foreground overlay [97]. It then composites the frame [95] from the layers according to this adjustment and transmits it to the display device [93] for display, ideally at the time that the user moves to the predicted point.

Naturally, a similar system could be used with a smaller, portable display device, such as the integral screen of a mobile phone. This could provide an augmented-reality environment where, for example, image elements generated by a game are shown overlaid on images of the real world from the phone's integral camera. In this example, the background is the video supplied by the camera, the middle layer or layers is or are game elements, and the foreground overlay is a game control menu allowing, for example, a selection of missiles to be 'thrown' at monsters shown in the middle layer. In this case, the sensors that act as input could include a gyroscope and accelerometer that detect movement of the phone, regardless of other movements made by the user.

Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and modules which are described as separate may be combined into single modules and vice versa. Functionality of the modules may be embodied in one or more hardware processing device(s) e.g. processors and/or in one or more software modules, or in any appropriate combination of hardware devices and software modules. Furthermore, software instructions to implement the described methods may be provided on a computer readable medium.

The invention claimed is:

1. A method for compositing display data at a remote device to form an image for display, the remote device receiving elements of the image for compositing from a host device over a transmission channel, wherein the image comprises at least display data forming a background layer, display elements forming one or more foreground layers and an overlay data layer, the method comprising:
   receiving, at the remote device, sensor information comprising data indicating a direction of focus of an eye of a viewer and data indicating a distance between the eye of the viewer and a display,
      wherein the data indicating the direction of focus of the eye of the viewer and the data indicating the distance between the eye of the viewer and the display are acquired via a focus tracker coupled to the remote device;
   generating the image, at the remote device, using the sensor information;
   determining, at the remote device, a movement of a line of sight between the eye of the viewer and the display;
   determining, at the remote device, an estimate of a future position of the line of sight at a future time based on the determined movement of the line of sight;
   determining, at the remote device, an adjustment to be made to the image based on the future position of the line of sight, the adjustment comprising a change of at least one of:
      the display data forming the background layer,
      the display elements forming the one or more foreground layers, or
      a location of the display elements relative to the display data;
   compositing, at the remote device, the display elements of the at least one foreground layer relative to the display data of the background layer according to the determined adjustment; and
   forwarding the composited image for displaying on the display at the future time.

2. The method of claim 1, wherein the movement of the line of sight between the eye of the viewer and the display is determined relative to any one of:
   a virtual frame of reference in the image being displayed; and
   an external frame of reference in which the viewer and the display are physically located.

3. The method of claim 1, wherein the sensor information includes one or more of:
   data indicating movement of the viewer's head; or
   data indicating movement of the display.

4. The method of claim 1, further comprising:
   determining, based on the determined adjustment whether the changed display data and/or changed display elements are available at the remote device for compositing; and
   if it is determined that the changed display data and/or changed display elements are not available at the remote device for compositing, obtaining the changed display data and/or changed display elements from the host device over the transmission channel.

5. The method of claim 1, wherein the foreground layers include a middleground layer between the background layer and the one or more foreground layers.

6. The method of claim 1, wherein each of display elements comprises a discrete portion of the image forming an independent element that can be translated or transformed as a unitary object.

7. The method of claim 1, further comprising:
   sending one or more of the sensor information, determined movement of the line of sight, or the estimate of the future position of the line of sight at a second future time to the host device; and
   receiving, from the host device, display data and/or display elements that the host device determines may be needed for compositing into an image at a third future time.

8. The method of claim 1, wherein the remote device is configured to be worn on the head of the viewer.

9. The method of claim 1, wherein the remote device comprises a set of glasses or a headset.

10. The method of claim 9, wherein the headset is a virtual reality headset or wherein the set of glasses is an augmented reality set of glasses.

11. A remote device configured to perform the method of claim 1.

12. A system comprising a host device connected to the remote device of claim 11.

13. The system of claim 12, wherein the host device is configured to perform a method comprising:
   transmitting elements of the image for compositing to a remote device over a transmission channel, wherein the image comprises at least display data forming a background layer, display elements forming one or more foreground layers and an overlay data layer, the method comprising:
   receiving one or more of:
      sensor information, wherein the sensor information indicates one or more of:
         a position of an eye of a viewer;
         a direction of focus of the eye of the viewer; or
         a position of a display;
      a determined movement of a line of sight between the eye of the viewer and the display, and
      an estimate of a future position of the line of sight at a future time based on the determined movement of the line of sight;
      wherein, if the estimate of a future position of the line of sight at a future time is not received, but the sensor information is received, the method further comprises, at the host device, determining movement of a line of sight between the eye of the viewer and the display, and determining an estimate of a future position of the line of sight at a first future time based on the determined movement of the line of sight, and
      wherein if the estimate of a future position of the line of sight at a future time is not received, but the movement of a line of sight between the eye of the viewer and the display is received, the method further comprises, at the host device, determining an estimate of a second future position of the line of sight at a second future time based on the determined movement of the line of sight,
   determining an adjustment to be made to the image based on the first or second future position of the line of sight, the adjustment comprising a change of at least one of:
      the display data forming the background layer,
      the display elements forming the one or more foreground layers, or
      a location of the display elements relative to the display data;
   determining, based on the determined adjustment whether the changed display data and/or changed display elements are available at the remote device for compositing; and if it is determined that the changed display data and/or changed display elements are not available at the remote device for compositing, transmitting the changed display data and/or changed display elements to the remote device over the transmission channel.

14. A method at a host device to facilitate compositing an image at a remote device for display, the method comprising:
transmitting elements of the image for compositing to the remote device over a transmission channel, wherein the image comprises at least display data forming a background layer, display elements forming one or more foreground layers and an overlay data layer, the method comprising:
receiving one or more of:
sensor information indicating a direction of focus of the eye of the viewer and a distance between the eye of the viewer and a display,
wherein the sensor information indicating the direction of focus of the eye of the viewer and the distance between the eye of the viewer and the display are acquired via a focus tracker coupled to the remote device, and
wherein the sensor information is used to generate the image at the remote device;
a determined movement of a line of sight between the eye of the viewer and the display, and
an estimate of a future position of the line of sight at a future time based on the determined movement of the line of sight;
wherein, if the estimate of a future position of the line of sight at a future time is not received, but the sensor information is received, the method further comprises, at the host device, determining movement of a line of sight between the eye of the viewer and the display, and determining an estimate of a future position of the line of sight at a first future time based on the determined movement of the line of sight, and
wherein if the estimate of a future position of the line of sight at a future time is not received, but the movement of a line of sight between the eye of the viewer and the display is received, the method further comprises, at the host device, determining an estimate of a second future position of the line of sight at a second future time based on the determined movement of the line of sight,
determining an adjustment to be made to the image based on the first or second future position of the line of sight, the adjustment comprising a change of at least one of:
the display data forming the background layer,
the display elements forming the one or more foreground layers, or
a location of the display elements relative to the display data;
determining, based on the determined adjustment whether the changed display data and/or changed display elements are available at the remote device for compositing; and
if it is determined that the changed display data and/or changed display elements are not available at the remote device for compositing, transmitting the changed display data and/or changed display elements to the remote device over the transmission channel.

\* \* \* \* \*